United States Patent [19]

Higuchi et al.

[11] 4,090,619

[45] May 23, 1978

[54] MACHINE FOR SCRAPING UP GRIT

[75] Inventors: Minoru Higuchi; Tetuo Yamagata, both of Amagasaki, Japan

[73] Assignee: Hitachi Kiden Kogyo Ltd., Amagasaki, Japan

[21] Appl. No.: 713,220

[22] Filed: Aug. 10, 1976

[51] Int. Cl.² .......................................... B65G 65/38
[52] U.S. Cl. .................................. 214/16 R; 198/812; 214/17 DB
[58] Field of Search .............. 214/15 E, 16 R, 17 DB; 198/812

[56] References Cited

U.S. PATENT DOCUMENTS

| 719,119 | 1/1903 | Hurry et al. | 214/17 DB |
| 2,436,657 | 2/1948 | McCulloch | 198/812 |
| 3,830,383 | 8/1974 | Skippon et al. | 198/812 X |

Primary Examiner—Robert G. Sheridan

[57] ABSTRACT

A machine for scraping up grit which has a girder extending over grit chambers, an elevating frame parallel with the girder and adapted to rise and descend, a bucket conveyor stretched around sprocket wheels arranged at both ends of the elevating frame and at proper places above the girder, and a movable sprocket wheel, whereby scraping, scooping up and discharging of grit can be performed by the bucket conveyor.

6 Claims, 8 Drawing Figures

MACHINE FOR SCRAPING UP GRIT

This invention relates to a machine for continuously scraping up. Conventionally, a machine for scraping up grit, hereinafter called a grit scraping machine, uses a bucket conveyor of the fixed type. Such a conventional grit scraping machine, however, has the drawback that when a large quantity of earth and sand flows into the grit chambers in a short period of time as the result of a heavy rainfall, for example, the bucket conveyor maybe buried in the accumulated earth and sand in the grit chambers and becomes unworkable. Moreover, in the conventional machine a bucket conveyor is provided for each grit chamber, with resultant increase in the cost of the equipment.

In order to eliminate the above-mentioned disadvantages of the conventional machine, an apparatus as shown in FIG. 1 has been suggested. This apparatus comprises a girder 3 extending transversely over the grit chambers, a travelling bogie on the girder, a bucket elevator 10 mounted on the travelling bogie and a conveyor along the girder to discharge scraped up grit at the end of the girder. Even with this system, however, use of the bucket elevator makes the height of the machine larger and the required equipment, i.e. a conveyor, an elevator, a travelling bogie, etc. makes the construction of the machine more complicated, and the cost of equipment much higher.

The present invention is intended to eliminate the above disadvantages by performing scraping, scooping up and discharging of grit by a single bucket conveyor. The grit scraping machine according to the present invention comprises a girder which can travel freely over grit chambers; an elevating frame which is parallel with the girder and is designed to go up and down between the bottom and the top part of the grit chamber; said elevating frame is suspended by the girder through the medium of a bucket conveyor having sprocket wheels arranged at proper places between its ends and the girder; and a movable sprocket wheel which is slidable along a guide rail installed in the lengthwise direction of the girder and is interposed in the bucket conveyor system. By the moving of this sprocket wheel the elevating frame is made to rise and elevating lift of the elevating frame In the present invention, the machine is provided with an elevating apparatus comprising an elevating frame, a chain (or wire rope or the like) and a group of sprocket wheels. By the moving of the movable sprocket wheel the elevating frame is made to rise and descend, while remaining in the position set beforehand and by increasing the number of movable sprocket wheels, elevating frame can be increased.

The present invention is described below, with reference to several embodiments and accompanying drawings, in which.

Figure 1:
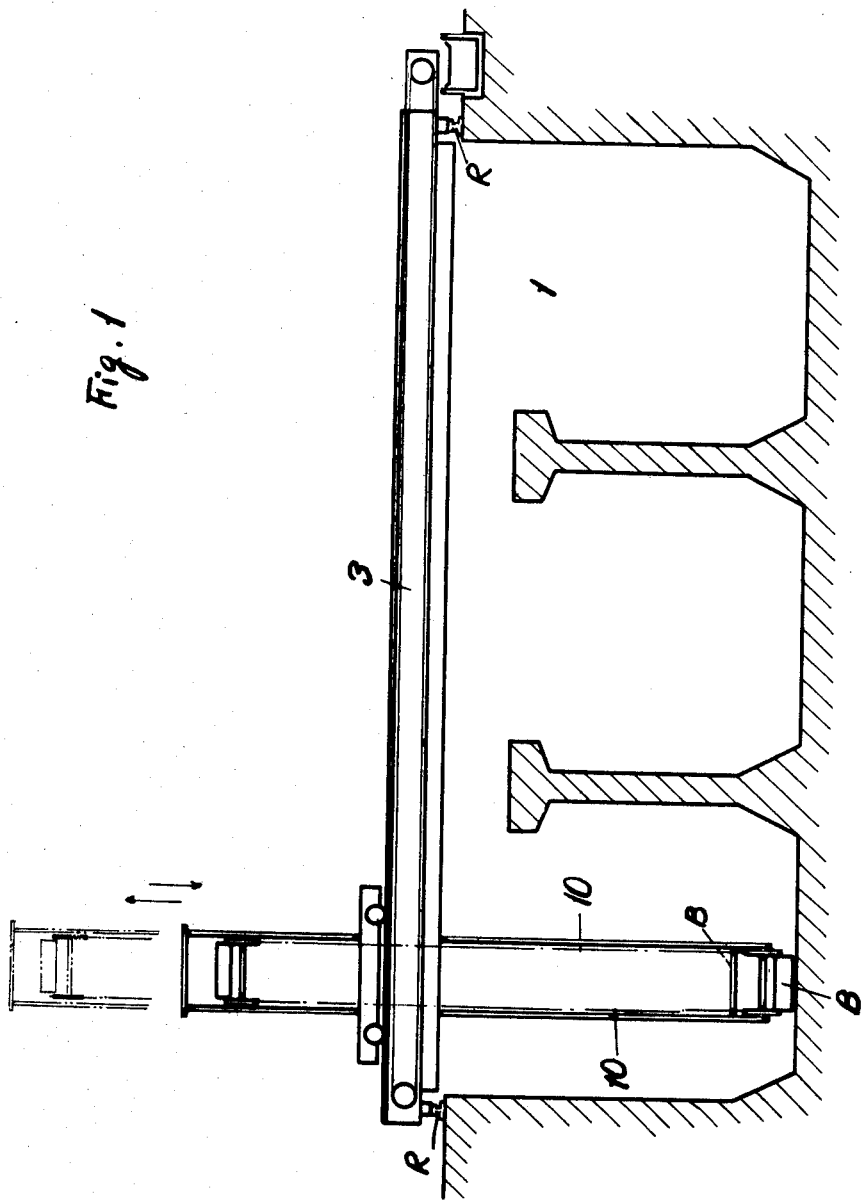
FIG. 1 is an elevation view of a conventional grit scraping machine.
Figure 2:
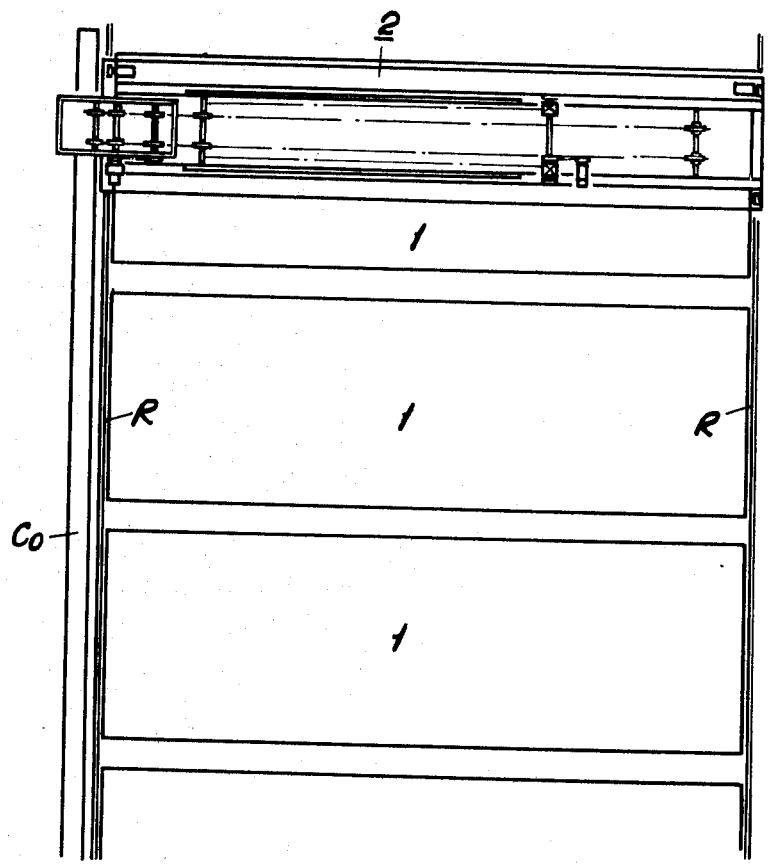
FIG. 2 is a plan view of the grit scraping machine according to the present invention.

In the drawings, numeral 1 denotes grit chambers having the desired length, depth and width. As shown by FIG. 2, these grit chambers 1 may be arranged in two or more rows. Rails R are laid at both ends of the group of grit chambers in the lengthwise direction of the grit chamber 1 in such a fashion that they are transverse to the water course at right angles thereto. Above these rails R is provided a girder 3 of a grit scraping machine 2 extending transversely of the grit chambers 1 at right angles. Arranged above this girder 3 are end sprocket wheels 4a, and 4e at both ends of the girder and sprocket wheels 4b, 4c, 4d and 4f intermediate the ends. Arranged below the girder 3 is an elevating frame 8 having at its two ends sprocket wheels 9a, and 9b. A bucket conveyor 10 of the endless chain or belt type is stretched around sprocket wheels 4a, 4b - 4f of the girder 3 and sprocket wheels 9a and 9b of the elevating frame 8, so that the elevating frame 8 can be suspended from the girder 3 by means of the bucket conveyor 10. A movable sprocket wheel 6 to control the use and descent of the elevating frame 8 is mounted on the girder 3. This movable sprocket wheel 6 is pivotally secured to a guide G movably inserted mounted on a guide rail 7 on the girder 3. Provided on said guide G is a sheave 6a, coaxial with the abovementioned sprocket wheel. A wire rope W is placed around this sheave 6a. One end of this wire rope W is fixed to the one end of the guide rail 7 of the girder 3 (on the right end in the drawing) and the other end is wound on a take-up drum D provided at the end of the on which the wire rope W is fixed. This take-up drum D is rotated by an electric motor M. In response to the normal and reverse rotation of the take-up drum D, the wire rope W is taken up or unwound so that the above-mentioned movable sprocket wheel 6 can be moved along the guide rail 7. A tension detector 5 to detect the tension of the bucket conveyor is installed at the end of the guide rod 7 at which the above-mentioned wire rope W is fixed. As for the means for moving the movable sprocket wheel laterally, such means as a hydraulic cylinder, a threaded rod and other similar systems can be used as well as the wire rope system.

Figure 5:
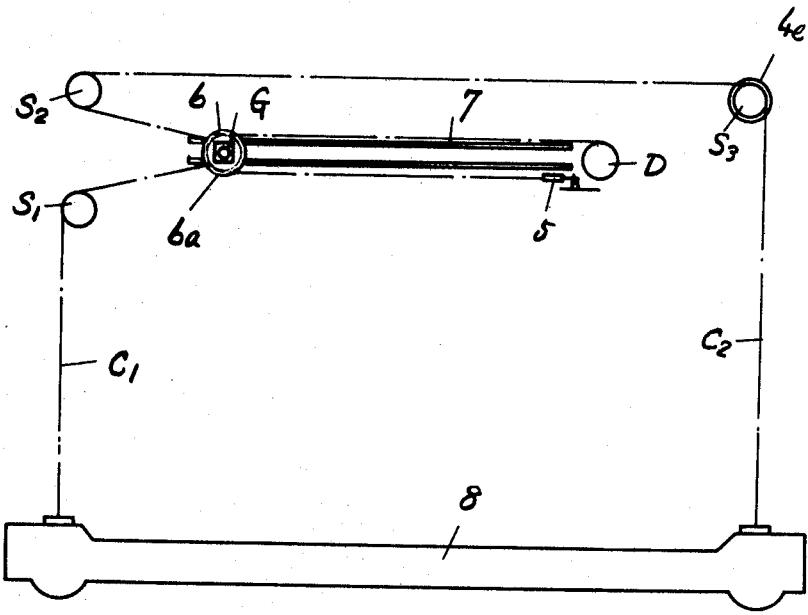
FIG. 5 is a diagram of the elevating apparatus for the elevating frame.

The elevating frame is suspended and held at both ends by auxiliary wire ropes (or chains) $C_1$ and $C_2$ in the proper position relative to the bottom of the chamber 1. (FIG. 5). The wire rope $C_1$ is connected, at its one end, to the left end of the elevating frame and, at the other end, to the guide G over a sheave $S_1$ mounted on one end the girder. Similarly, the other wire rope $C_2$ is connected, at its one end, to the right end of the elevating frame and, at the other end, to the guide G over sheaves $S_3$ at the other end of the girder and sheave $S_2$ mounted at the one end of the girder. In the case where the bottom of the grit chamber 1 is inclined, it is necessary to raise or lower one or the other end of the elevating frame to conform with the inclination of the bottom. In this case, the raising and lowering of the elevating frame is obtained by making the lengths of the wire ropes $C_1$ and $C_2$ such that they hold the elevating frame in the desired position.

Figure 4:
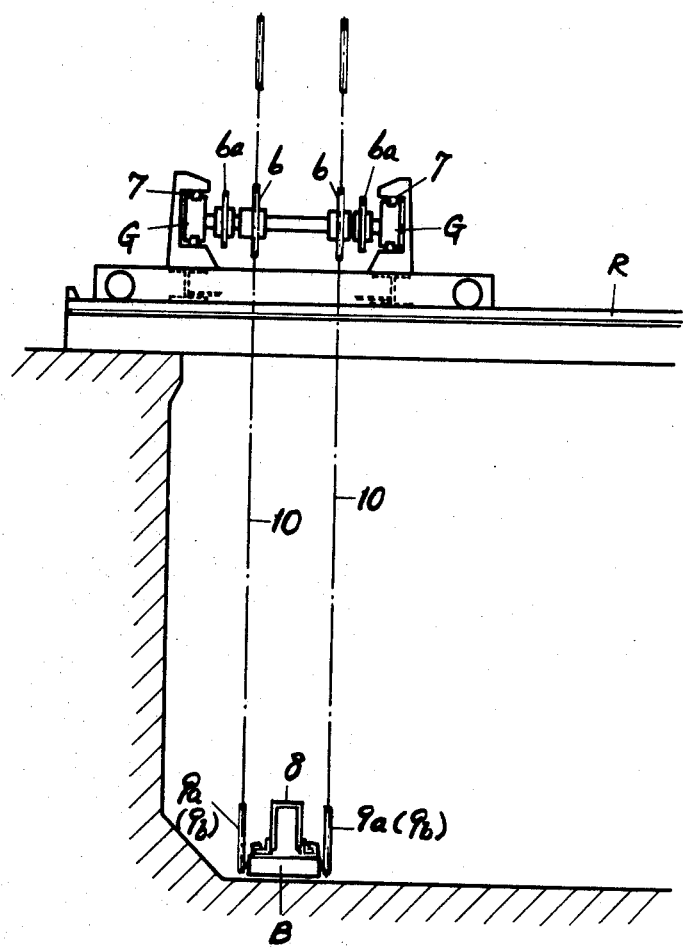
FIG. 4 is a side elevation of the grit scraping machine shown in FIG. 2.

In the above arrangement, the bucket conveyor is operated by driving one or more of the above-mentioned sprocket wheels 4a - 4f. The width of the bucket conveyor is almost the same as that of the grit chamber but may be smaller than that of the grit chamber as shown in FIG. 4.

Figure 6:
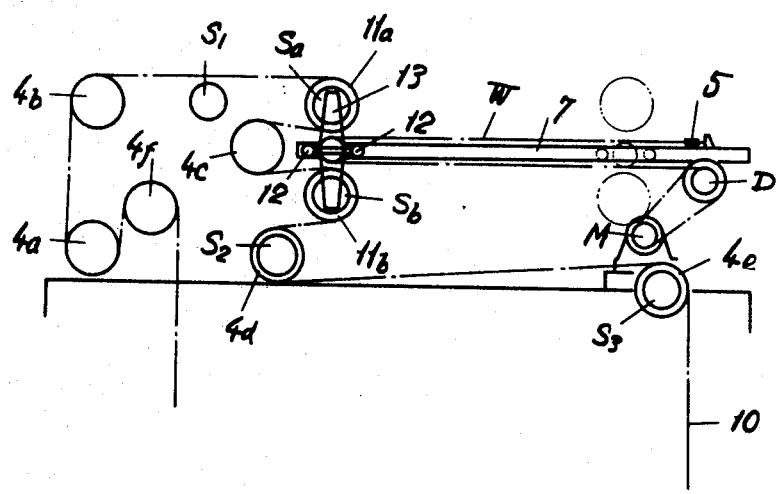
FIG. 6 and FIG. 7 are diagrammatic views of different embodiments of the present invention.
Figure 7:
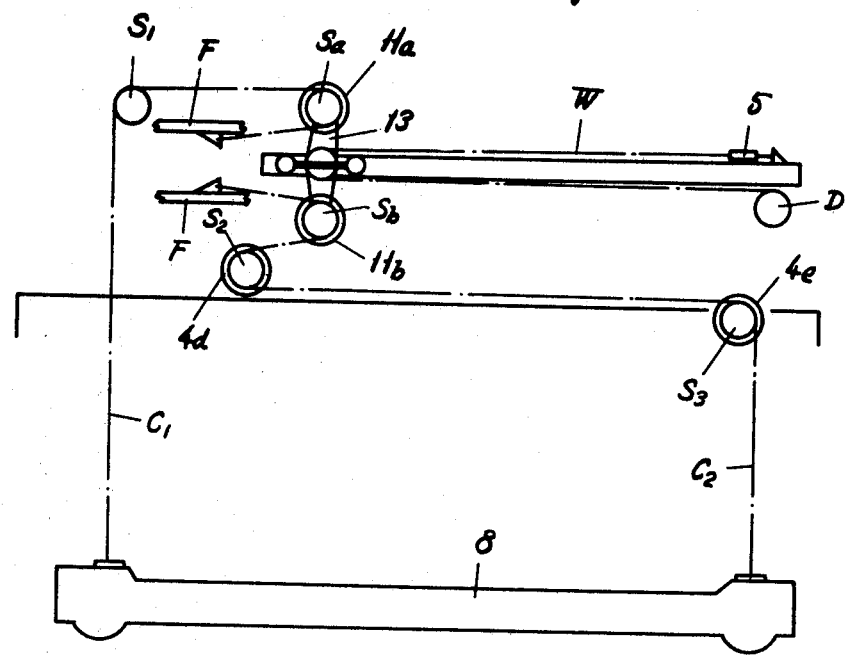
Figure 8:
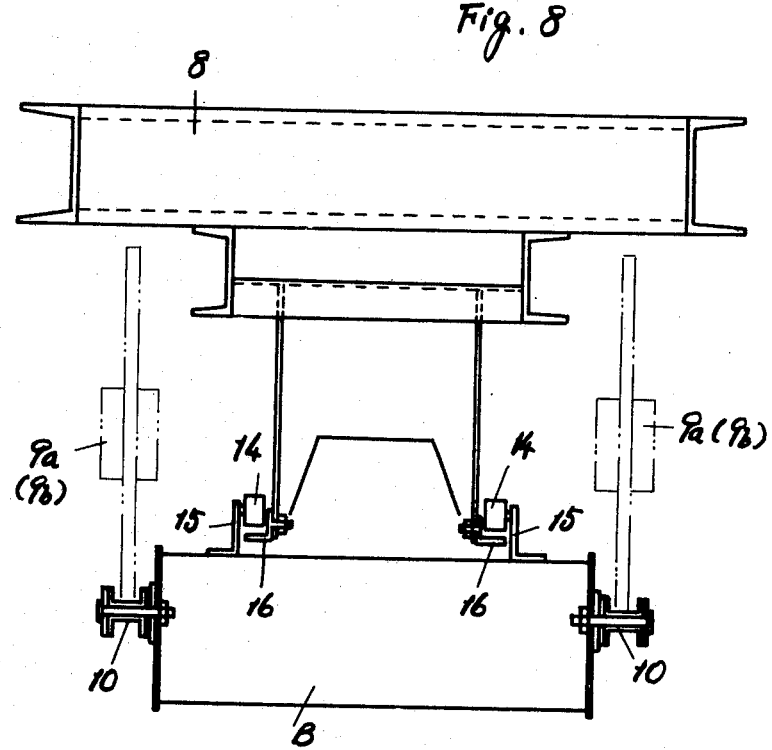
FIG. 8 is a detail of the main part of the bucket.

In the case where the amount of movement of the movable sprocket wheel necessary to obtain the desired raising of the elevating frame by the above-described means cannot be achieved because the depth of the grit chamber is especially large in relation to the length of the grit chamber, sprocket wheels 11a and 11b can be provided on the upper and the lower sides of a movable frame 13 which is movably mounted on guide wheels 12 for movement along the guide rail 7 as shown in FIG. 6 so that use of the elevating frame by an amount which corresponds to two times the amount of movement of the movable frame can be obtained. In this case, the auxiliary rope is arranged as shown in FIG. 7, namely, the wire rope $C_1$ is connected, at its one end, to the left end of the elevating frame and is connected, at the other end, to the frame F at the end of the guide rail opposite the end toward which the frame 13 moves (left side in the drawing) over the sheave $S_1$ and a sheave $S_a$ which is coaxial with the movable sprocket wheel 11a. Similarly, the wire rope $C_2$ is connected, at its one end, to the right end of the elevating frame and is connected, at the other end, to the frame F over sheaves $S_3$, $S_2$ and $S_b$ which is coaxial with the movable sprocket wheel 11b.

Figure 3:
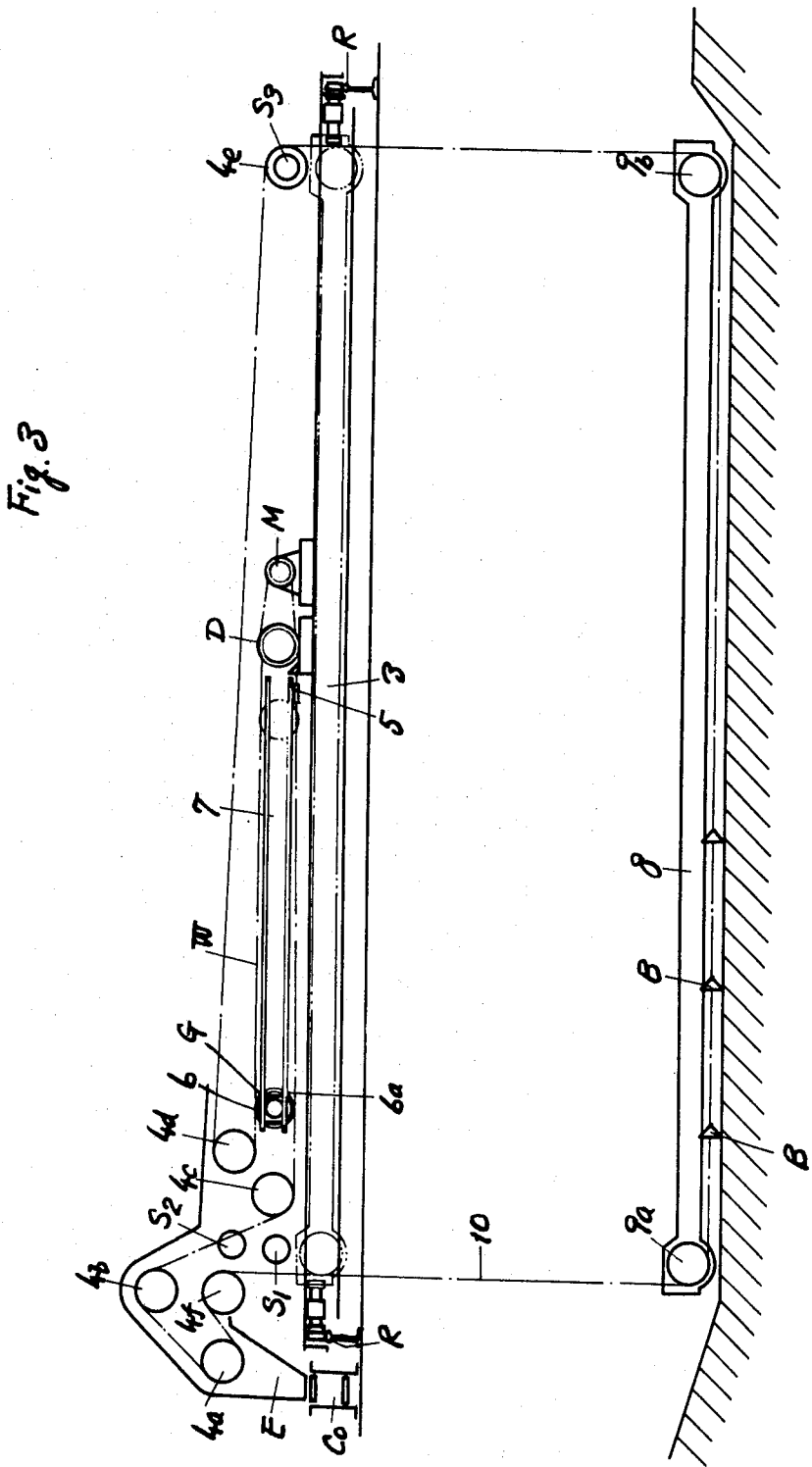
FIG. 3 is a front elevation view of the grit scraping machine shown in FIG. 2.

Provided at one end of the grit chamber and parallel with the rail R at right angles to the chamber is a conveyor Co for discharging grit. Grit which is scraped up by means of the bucket conveyor 10 is transferred into the conveyor Co via a chute E (FIG. 3).

When scraping up grit by the grit scraping machine of the above-described construction, the girder is located at the desired position above the grit chamber and the elevating frame (kept above the chamber when not in use) is lowered. The elevating frame is lowered due to its own weight when the wire rope is unwound by turning the take-up drum D reversely. By means of the tension detector 5, contact of the elevating frame with the grit on the bottom of the chamber can be detected. By driving the bucket conveyor 10, grit on the bottom of the grit chamber is scraped up by buckets B and the grit in the buckets B is dropped into the chute E by tilting the bucket. Then the grit in the chute is transferred to the desired place via the conveyor Co provided just below the bottom of the chute. In this case, if the width of the bucket is smaller than that of the grit chamber, the girder is moved laterally by degrees until all grit in one grit chamber is scraped up and discharged.

When the grit scraping machine is moved to the next grit chamber, the bucket conveyor 10 and the elevating frame 8 are drawn up from the grit chamber by taking up the wire rope W by means of the take-up drum D and by moving the movable sprocket wheel 6 toward the right end of the guide rail. The wire ropes $C_1$ and $C_2$ are also taken up at the same time since the ends are attached to guide G. Then, the girder is moved to the next desired position. The amount of movement of the movable sprocket wheel 6 is such that the elevating frame can be shifted to an adjacent grit chamber without trouble and the bucket conveyor can make proper contact with the bottom of the grit chamber when the elevating frame descends. In order to prevent the bucket conveyor from hanging down from the elevating frame when grit is scraped up by the bucket conveyor, guide rails 16 are provided along both sides of the elevating frame 8 and a hanger 15 having a guide shoe (or a roller) 14 is provided above the bucket so that the bucket conveyor will move in parallel with the elevating frame at all times.

In the above-described embodiment, the girder is positioned in the lengthwise direction of the grit chamber but it is possible to carry out scraping up of grit by positioning the girder in the direction of the grit chamber. The bucket used by the machine according to the present invention can be replaced with a collecting flight.

According to the present invention, a bucket conveyor extending over almost the whole length of the grit chamber is provided on a girder which extends in the lengthwise direction of the grit chamber and a part of said bucket conveyor is adapted to reach the bottom of the grit chamber. Under this arrangement, scraping and scooping up of grit can be carried out by one and the same bucket conveyor for all the grit chambers. Moreover, since the amount the bucket conveyor is lowered can be adjusted as desired, scraping up of grit is possible irrespective of the quantity of grit accumulated on the bottom of the grit chamber. Furthermore, because the bucket conveyor is kept above the grit chamber when not in use, it is entirely free from the danger of being buried in earth and sand which suddenly flow into the chambers. Also, the machine according to the present invention has the advantage that its height can be made small because the bucket conveyor is raised and lowered by moving the movable sprocket wheel laterally.

What we claim is:

1. A grit scraping machine comprising a girder movably mounted for travelling freely over grit chambers; an elevating frame parallel with said girder and movable relative to said girder to ascend and descend between the bottom and upper part of the grit chambers; sprocket wheels at both ends of said elevating frame and at a plurality of fixed positions above said girder; an endless bucket conveyor extending around said sprocket wheels and suspending said elevating frame from said girder; at least one movable sprocket wheel slidable along said girder in the lengthwise direction of said girder and engaging said bucket conveyor for causing said elevating frame to rise by movement of said movable sprocket wheel in one direction along said girder and allowing said elevating frame to fall due to its own weight during movement of said movable sprocket wheel along said girder in the other direction.

2. A grit scraping machine as claimed in claim 1 further comprising a rope or chain each attached at one end to one end of said elevating frame and at the other end to said movable sprocket wheel for being drawn along with said sprocket wheel during movement thereof, and sheaves over which said ropes or chains are led to said sprocket wheel in a direction to move with said sprocket wheel.

3. A grit scraping machine as claimed in claim 2 in which said ropes or chains are the same length for holding said elevating frame parallel to the girder.

4. A grit scraping machine as claimed in claim 2 in which said ropes or chains are different lengths for holding said elevating frame at an angle to said girder.

5. A grit scraping machine as claimed in claim 1 in which there are two of said first-mentioned sprocket wheels above said girder and vertically spaced, and there is a single movable sprocket wheel movable along said girder and engaging said bucket conveyor between said two first-mentioned sprocket wheels for drawing said bucket conveyor into a single loop extending along said girder.

6. A grit scraping machine as claimed in claim 1 in which there are three of said first-mentioned sprocket wheels above said girder and vertically spaced, and there are two movable sprocket wheels movable along said girder, one engaging the bucket conveyor between the uppermost and middle first-mentioned sprocket wheels, and the other engaging the bucket conveyor between the middle and lower first-mentioned sprocket wheels for drawing the bucket conveyor into two loops extending along said girder.

* * * * *

UNITED STATES PATENT AND TRADEMARK OFFICE
CERTIFICATE OF CORRECTION

PATENT NO. : 4,090,619
DATED : May 23, 1978
INVENTOR(S) : MINORU HIGUCHI, TETUO YAMAGATA

It is certified that error appears in the above-identified patent and that said Letters Patent are hereby corrected as shown below:

column 1, line 47, for "elevating lift of the elevating frame", read --descend.-- column 1, line 55, after "wheels," read --elevating lift of the--

Signed and Sealed this

Thirty-first Day of October 1978

[SEAL]

Attest:

RUTH C. MASON
Attesting Officer

DONALD W. BANNER
Commissioner of Patents and Trademarks